US010141702B2

(12) United States Patent
Weigel et al.

(10) Patent No.: US 10,141,702 B2
(45) Date of Patent: Nov. 27, 2018

(54) DISCHARGE DEVICE

(71) Applicant: SCHUNK BAHN—UND INDUSTRIETECHNIK GMBH, Wettenberg (DE)

(72) Inventors: Wilfried Weigel, Dautphetal (DE); Steffen Weller, Asslar (DE)

(73) Assignee: SCHUNK BAHN—UND INDUSTRIETECHNIK GMBH, Wettenberg (DE)

( * ) Notice: Subject to any disclaimer, the term of this patent is extended or adjusted under 35 U.S.C. 154(b) by 288 days.

(21) Appl. No.: 14/917,381

(22) PCT Filed: Sep. 9, 2014

(86) PCT No.: PCT/EP2014/069211
§ 371 (c)(1),
(2) Date: Mar. 8, 2016

(87) PCT Pub. No.: WO2015/032989
PCT Pub. Date: Mar. 12, 2015

(65) Prior Publication Data
US 2016/0218473 A1    Jul. 28, 2016

(30) Foreign Application Priority Data
Sep. 9, 2013   (DE) .................. 10 2013 014 782

(51) Int. Cl.
*H01R 39/39*    (2006.01)
*H02K 11/40*    (2016.01)
*H01R 39/38*    (2006.01)

(52) U.S. Cl.
CPC ............. *H01R 39/39* (2013.01); *H02K 11/40* (2016.01); *H01R 39/38* (2013.01); *H01R 39/383* (2013.01)

(58) Field of Classification Search
CPC ...... H01R 39/39; H01R 39/38; H01R 39/383; H02K 11/40
See application file for complete search history.

(56) References Cited

U.S. PATENT DOCUMENTS

| 4,368,398 A | 1/1983 | Mabuchi |
| 4,748,079 A | 5/1988 | Thebault |
(Continued)

FOREIGN PATENT DOCUMENTS

| DE | 2421497 A1 | 11/1974 |
| JP | S55120262 U | 8/1980 |
| JP | S6221768 U | 2/1987 |

OTHER PUBLICATIONS

PCT English Language Translation of the International Preliminary Report on Patentability, PCT/EP2014/069211, dated Mar. 24, 2016.
(Continued)

*Primary Examiner* — Zeev V Kitov
(74) *Attorney, Agent, or Firm* — Quarles & Brady LLP

(57) ABSTRACT

The invention relates to a discharge device for discharging electrostatic charges from a shaft comprising a flexurally elastic conductor having a carbon fiber arrangement comprising at least two conductor portions (21, 22), which are arranged on a holder, extend transversely to a longitudinal axis of the shaft and are insulated from the holder and which can be connected to a ground conductor (42) via their portion ends (40, 41), which are accommodated in the holder, each of the conductor portions having a shaft contact portion (30, 31), and the shaft contact portions together forming a contact arrangement for making contact with two circumferential contact regions (33, 34) of a shaft circumference (32, 35) arranged opposite each other in a shaft contact plane W, such that the shaft contact portions are (Continued)

arranged tangentially to the shaft circumference when making contact with the shaft circumference.

13 Claims, 2 Drawing Sheets

(56) References Cited

U.S. PATENT DOCUMENTS

| | | | | |
|---|---|---|---|---|
| 4,885,199 | A * | 12/1989 | Corbin | C04B 35/806 428/113 |
| 6,794,984 | B2 * | 9/2004 | Komatsu | H01R 39/22 338/118 |
| 2006/0228923 | A1 | 10/2006 | Swift et al. | |
| 2013/0057109 | A1 * | 3/2013 | Yu | H01R 39/385 310/244 |

OTHER PUBLICATIONS

PCT International Search Report, PCT/EP2014/069211, dated Mar. 27, 2015, 4 pages.

Japan Patent Office, Notification of Reason(s) for Refusal, Application No. P2016-539586, dated Aug. 31, 2018, 5 pages [English Language Translation Only].

* cited by examiner

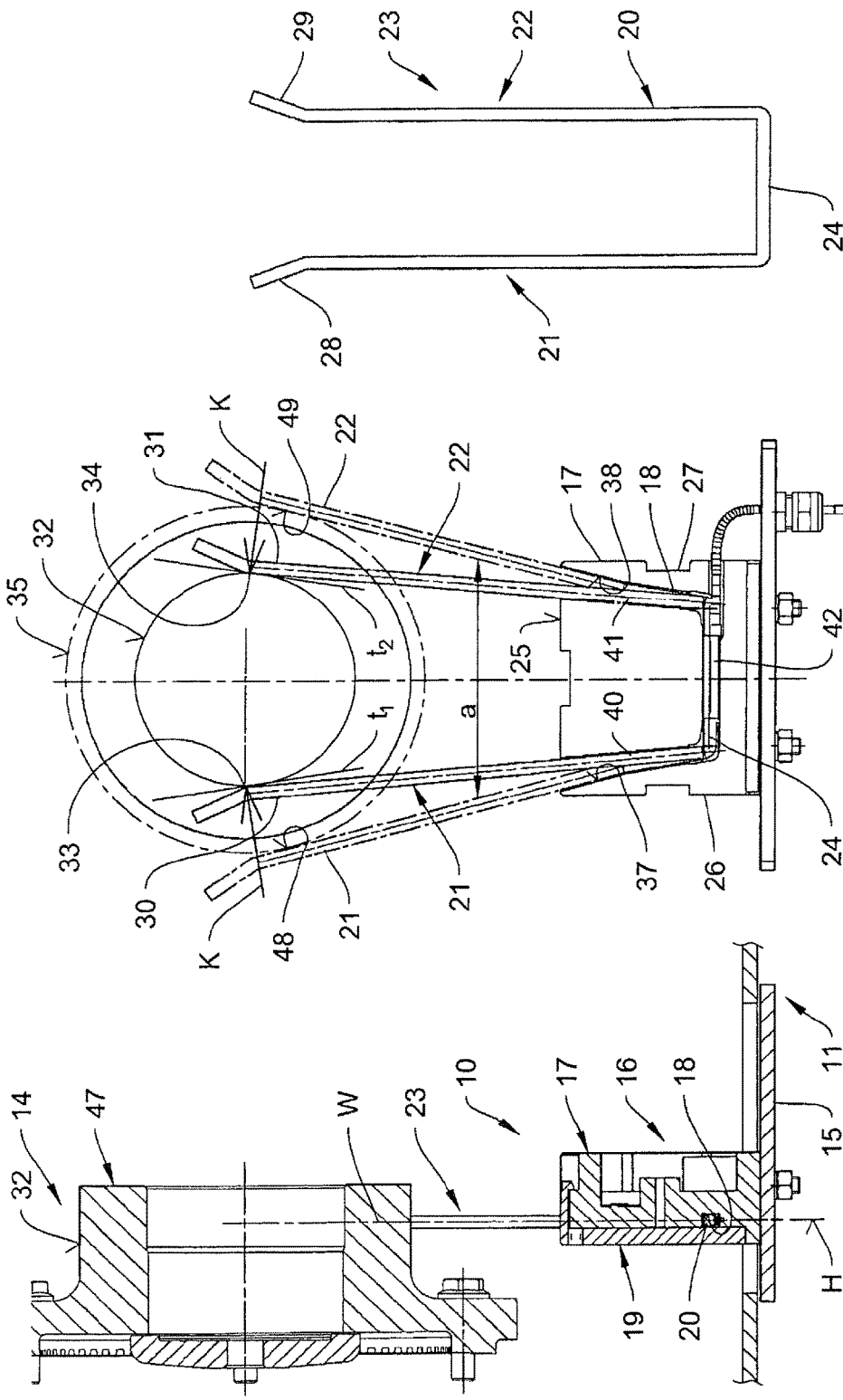

DISCHARGE DEVICE

CROSS-REFERENCE TO RELATED APPLICATIONS

This application represents the national stage entry of PCT International Application No. PCT/EP2014/069211 filed Sep. 9, 2014, which claims priority of German Patent Application 10 2013 014 782.4, filed Sep. 9, 2013, the contents of which are hereby incorporated herein by reference for all purposes.

The invention relates to a discharge device for discharging electrostatic charges from a shaft comprising a flexurally elastic conductor having a carbon fiber arrangement comprising at least two conductor portions, which are arranged on a holder, extend transversely to a longitudinal axis of the shaft and are insulated from the holder and which can be connected to a ground conductor via their portion ends, which are accommodated in the holder, each of the conductor portions having a shaft contact portion and the shaft contact portions together forming a contact arrangement for making contact with two circumferential contact regions of a shaft circumference arranged opposite each other in a shaft contact plane, such that the shaft contact portions are arranged tangentially to the shaft circumference when making contact with the shaft circumference.

From U.S. Pat. No. 7,193,836, a discharge device for discharging electrostatic charges from a shaft is known in which a carbon fiber arrangement made of a plurality of filaments is arranged on a holder, which is annular and arranged coaxially to the shaft. To form a physical contact with the shaft, shaft contact portions of the individual filaments are oriented normally to the shaft circumference. Physical contact between the filaments and the shaft circumference thus only occurs at the axial ends of the filaments. Owing to the arrangement of the carbon fiber arrangement on the annular holder, the known discharge device is suitable only for a shaft with a defined circumference.

The object of the present invention is to provide a discharge device that allows making safe contact with a shaft circumference independently of the direction of rotation and that is furthermore suitable for discharging electrostatic charges from shafts having different shaft diameters.

This object is attained by the discharge device according to the invention having the features of claim 1.

According to the invention, the discharge device is provided with a flexurally elastic conductor having a carbon fiber arrangement which comprises at least two conductor portions, which are arranged on a holder, extend transversely to a longitudinal axis of a shaft to be contacted and are insulated from the holder. The conductor portions can be connected to a ground conductor via their portion ends, which are accommodated in the holder. Each of the conductor portions has a shaft contact portion, said contact portions together forming a contact arrangement for making contact with two circumferential contact regions of a shaft circumference arranged opposite each other in a shaft contact plane. The shaft contact portions are arranged tangentially to the shaft circumference when making contact with the shaft circumference.

For insulated arrangement of the conductor portions or in particular of the portion ends of the conductor portions in the holder, the holder can be made of an electrically non-conductive material, in particular plastic.

Since the shaft contact portions, which abut tangentially against the shaft circumference at opposite circumference contact regions of the shaft circumference, are realized in double, the discharge device according to the invention functions independently of the direction of rotation. Moreover, the arrangement of the flexurally elastic conductor having portion ends of conductor portions extending transversely to a longitudinal axis of the shaft, said portion ends being accommodated in the holder, allows forming a contact between the shaft contact portions and the shaft circumference in case of different shaft diameters or shaft circumferences because the shaft contact portions can be moved apart owing to the flexurally elastic design of the conductor. In case of a larger shaft circumference, the conductor portions are deformed in a flexurally elastic manner, the shaft contact portions staying in tangential contact with the shaft circumference. An enlargement of the shaft circumference merely leads to a shift of the circumferential contact regions of the shaft arranged on the shaft circumference.

If, according to a preferred embodiment, the portion ends of the conductor portions are accommodated in a relatively mobile manner in conductor guides of the holder, in case of an enlargement of the distance between the shaft contact portions, at least part of said distance enlargement can be compensated by the relative movement of the portion ends in the conductor guides so that a flexural stress on the conductor portions is correspondingly reduced.

It is particularly advantageous if each of the conductor guides is formed by a guide channel in the holder, which has a channel diameter that is larger than the conductor diameter, so as to make the aforementioned relative mobility possible.

It is also particularly advantageous if the channel diameter of the guide channels widens toward a conductor exit surface of the holder so that there is no flexural resistance acting on the conductor portions in the area of the conductor exit surface.

If, according to another embodiment, the portion ends are accommodated in the holder in a longitudinally mobile manner such that the free conductor portions protruding out of the conductor can be changed in length, it is possible to adjust the quantity of the contact force by changing the free flexural length of the conductor and the resulting contact force, with which the shaft contact portions abut against the shaft circumference.

If the portion ends of the conductor portions are connected to each other via the ground conductor, it is possible to form the conductor portions from individual mutually independent conductor sections, which are to connected to each other via the ground conductor to form a contact together.

Alternatively, it is also possible to connect the portion ends with each other in one piece via a connecting portion so that the connecting portions is used to form the connection with the ground conductor.

Preferably, the conductor formed in one piece is U-shaped or V-shaped.

If, according to a special embodiment of the discharge device, the holder is arranged in a holder plane that is offset relative to the shaft contact plane, the conductor portions having a transition portion extending from the holder plane to the shaft contact plane, it is possible to arrange the holder in the direction of the longitudinal axis of the shaft in an offset manner relative to the shaft contact plane so as to adjust the arrangement to corresponding installation situations.

It is particularly advantageous if the carbon fiber arrangement of the conductor has a fiber network that is provided with a coating of pyrolytically deposited carbon so that the coating of pyrocarbon does not only serve to compact a contact surface of the conductor, but also forms an envelope that supports the fiber network and provides the desired flexurally elastic properties of the conductor in cooperation with the fiber network, said conductor having a flexural rigidity that can also be influenced in particular by the thickness of the coating.

Application of the CVI method (chemical vapor infiltration) has proved particularly advantageous for forming the coating since this method provides not only the desired surface coating, but additionally also the formation of bonding forces between the individual filaments of the fiber network.

It proves particularly advantageous if the fiber network is realized as an envelope of a unidirectional fiber strand extending in the longitudinal direction of the conductor and having filaments that run substantially parallel to one another so that the gaps between the fibers form capillaries, which allow the exploitation of capillary effects for the removal of fat or humidity from the shaft circumference.

To increase the flexural rigidity of the conductor, it is advantageous if is the fiber network is provided with a resin matrix.

It is particularly advantageous for the practical use of the discharge device and for a reduction of the maintenance effort in connection with the replacement of a conductor of the discharge device if the holder is realized as a housing cover or is connected to the housing cover.

In the following description, advantageous embodiments of the invention will be explained in more detail with reference to the drawing.

In the drawing:

FIG. 1 shows a discharge device according to a first embodiment in a longitudinal-section view;

FIG. 2 shows the discharge device illustrated in FIG. 1 in a front view;

FIG. 3 shows a conductor of the discharge device in an individual illustration;

Figure 4:
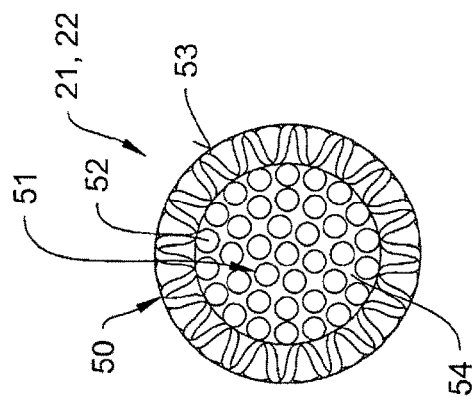
FIG. 4 shows a cross-section through the conductor illustrated in FIG. 3.

In FIGS. 1 and 2, a discharge device 10 is illustrated, which is installed on a shaft coupling 14 arranged in a machine housing 11 between a transmission shaft and a motor shaft. The machine housing 11 has a maintenance opening provided with a maintenance cover 15, said maintenance cover 15 being simultaneously used to arrange the discharge device 10.

The discharge device 10 has a holder 16, which is connected to the maintenance cover 15. As becomes apparent in particular from a combined view of FIGS. 1 and 2, in the case of the embodiment example at hand, the holder 16 comprises a holder body 17, which is preferably made of plastic and has a U-shaped guide channel arrangement 18 formed in the holder body 17, and a holder cover 18, which is also made of plastic in the embodiment example at hand. The guide channel arrangement 18 serves to receive an attachment part 20 of a conductor 23, conductor portions 21, 22 of said conductor being guided out of the guide channel arrangement 18.

In the case of the present embodiment example as illustrated in FIG. 3, prior to its installation, the conductor 23 has a U-shaped design including the two conductor portions 21, 22 formed by the legs of the U and a connecting portion 24 forming the base of the U and undergoes a slight spreading of the conductor portions 21, 22, which are formed by the legs, after its attachment part 20 is arranged in the guide channel arrangement 18 because, as shown in FIG. 2, guide channels 37, 38 of the guide channel arrangement 18, which extend toward an upper conductor exit surface 25 of the holder 16, are slightly inclined toward the lateral surfaces 26, 27 of the holder 16. After arrangement of the attachment part 20 of the conductor 23, the configuration of the conductor 23 illustrated in FIG. 2 is set, and the holder cover 19 is connected to the holder body 17 so as to secure the conductor 23 in said configuration.

As shown in FIGS. 2 and 3, the conductor portions 21, 22 are provided with conductor ends 28, 29 at their ends, said conductor ends 28, 29 being bent outward in an inclined manner and preventing the conductor ends 28, 29 from being buckled when the discharge device 10 is installed, during which the discharge device 10 is radially guided toward a coupling flange 47 of the shaft coupling 14.

It becomes clear from FIGS. 1 and 2 that the conductor portions 21, 22 are arranged in a shaft contact plane W, which, in the case of the discharge device 10, coincides with a holder plane H, in which the attachment part 20 of the conductor 23 is located. Furthermore, in particular FIG. 2 shows that shaft contact portions 30, 31 of the conductor portions 21, 22 tangentially abut against a shaft circumference 32 in the circumference contact regions 33, 34, said shaft circumference 32 being formed in this case by the mantle surface of the coupling flange 47, the shaft contact portions 30, 31 abutting against the shaft circumference 32 in the circumference contact regions 33, 34 with a contact force K because of the flexurally elastic design of the conductor portions 21, 22. This becomes especially clear from the illustration of contact tangents t1 and t2 depicted in FIG. 2 in the circumference contact regions 33, 34.

As becomes apparent further from the illustration according to FIG. 2, the conductor 23 of the discharge device 10 does allow its conductor portions 21, 22 to form a contact not only with the shaft circumference 32, but additionally also with comparatively larger shaft circumferences.

By way of example, the dashed and dotted line in FIG. 2 shows a larger shaft circumference 35. Accordingly, when a contact is formed between the conductor portions 21, 22 and the larger shaft circumference 35, an enlarged distance a forms between the conductor portions 21, 22, which are illustrated in this position with a dashed and dotted line, too. Because of the channel diameter of the guide channels 37, 38 widening toward the conductor exit surface 25 of the holder, portion ends 40, 41 of the conductor portions 21, 22 are arranged in a mobile manner in the guide channels 37, 38, and bending of the conductor portions 21, 22 substantially happens in the lower region of the guide channels 37, 38 in a transition region between the conductor portions 21, 22 and the connecting portion 24.

In the case of the illustrated embodiment example, the connecting portion 24 is used for connection of a ground conductor 42.

As can also be taken from FIG. 2, an enlarged distance a between the conductor portions 21, 22 due to formation of a contact between the conductor portions 21, 22 and a larger shaft circumference 35 causes the formation of circumference contact regions 48, 49 that are shifted downward, i.e. toward the holder 16.

FIG. 4 shows an enlarged cross-sectional illustration of a conductor portion 21, 22, from which it can be taken that the carbon fiber arrangement of the conductor has a fiber network 50 that is realized as an envelope of a unidirectional fiber strand 51 extending in the longitudinal direction of the conductor 23 and comprising filaments 52 that extend substantially parallel to one another. The fiber network 50 is provided with a coating 53 of pyrolytically deposited carbon, which causes a stiffening of the conductor in the direction of a transverse force acting thereon, such as the contact force K delineated in FIG. 2. A capillary effect is made possible by the fiber gaps 54 formed between the filaments 52 of the fiber strand 51.

Figure 6:
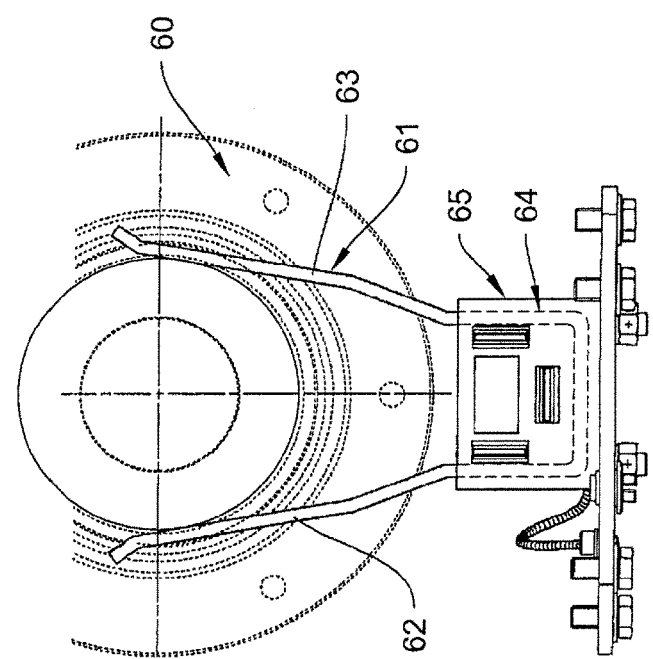
FIG. 6 shows the discharge device illustrated in FIG. 5 in a front view.
Figure 5:
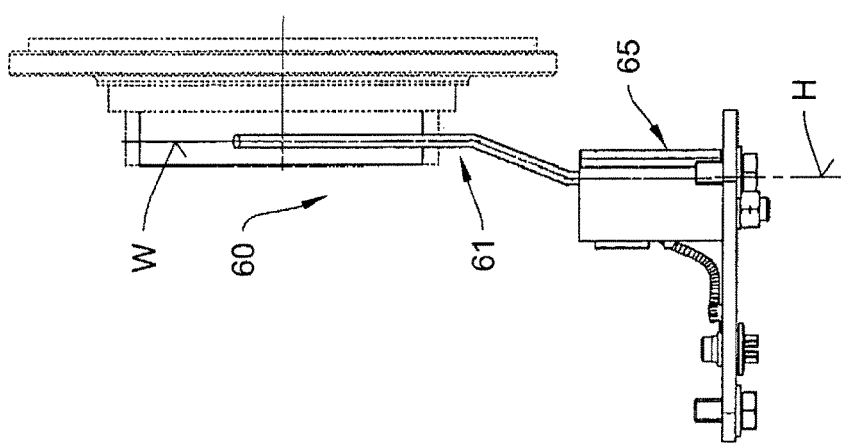
FIG. 5 shows another embodiment of a discharge device in a lateral view.

In FIGS. 5 and 6, a discharge device 60 is illustrated that is different from the discharge device 10 explained with reference to FIGS. 1 and 2 in that it has a conductor 61 that has conductor portions 62, 63 that are realized adjacent to an attachment part 64 that serves to be accommodated in a holder 65. The conductor portions 62, 63 have transition portions 66, 67, which extend in an inclined manner and which, as illustrated in particular in FIG. 5, allow the discharge device 60 to be installed in such a manner that the holder 65 is arranged in a holder plane H that is offset relative to the shaft contact plane W.

The invention claimed is:

1. A discharge device for discharging electrostatic charges from a shaft comprising a flexurally elastic conductor having a carbon fiber arrangement comprising at least two conductor portions, which are arranged on a holder, extend transversely to a longitudinal axis of the shaft and are insulated from the holder and which can be connected to a ground conductor via their portion ends, which are accommodated in the holder, each of the conductor portions having a shaft contact portion, and the shaft contact portions together forming a contact arrangement for making contact with two circumferential contact regions of a shaft circumference arranged opposite each other in a shaft contact plane W, in such a manner that the shaft contact portions are arranged tangentially to the shaft circumference when making contact with the shaft circumference, a tangential contact is upheld when enlarging the shaft circumference and merely circumferential contact areas of the shaft arranged on the shaft circumference are displaced.

2. The discharge device according to claim 1, wherein
the portion ends of the conductor portions are accommodated in a relatively mobile manner in conductor guides of the holder.

3. The discharge device according to claim 2, wherein
the conductor guides are each formed by a guide channel in the holder, said guide channel having a channel diameter that is larger than the conductor diameter.

4. The discharge device according to claim 3, wherein
the channel diameter of the guide channels widens toward a conductor exit surface of the holder.

5. The discharge device according to claim 2, wherein
the portion ends are accommodated in the holder in a longitudinally mobile manner such that the free conductor portions protruding out of the holder can be changed in length.

6. The discharge device according to claim 1, wherein
the portion ends are connected to each other via the ground conductor.

7. The discharge device according to claim 1, wherein
the portion ends are connected to each other in one piece via a connecting portion and the connecting portion is used to form the connection with the ground conductor.

8. The discharge device according to claim 7, wherein
the conductor is U-shaped or V-shaped.

9. The discharge device according to claim 1, wherein
the conductor is arranged in a holder plane H that is offset relative to the shaft contact plane W, the conductor portions having a transition portion extending in an inclined manner from the holder plane H to the shaft contact plane W.

10. The discharge device according to claim 1, wherein
the carbon fiber arrangement of the conductor has a fiber network that is provided with a coating of pyrolytically deposited carbon.

11. The discharge device according to claim 10, wherein
the fiber network is realized as an envelope of a unidirectional fiber strand extending in the longitudinal direction of the conductor.

12. The discharge device according to claim 10, wherein
the fiber network is provided with a resin matrix.

13. The discharge device according to claim 1, wherein
the holder is realized as a housing cover or is connected to a housing cover.

* * * * *

UNITED STATES PATENT AND TRADEMARK OFFICE
CERTIFICATE OF CORRECTION

PATENT NO. : 10,141,702 B2
APPLICATION NO. : 14/917381
DATED : November 27, 2018
INVENTOR(S) : Weigel et al.

Page 1 of 1

It is certified that error appears in the above-identified patent and that said Letters Patent is hereby corrected as shown below:

In the Specification

Column 2, Line 46, "are to connected to" should be --are connected to--.

Column 3, Line 21, "if is the" should be --if the--.

Signed and Sealed this
Fifteenth Day of January, 2019

Andrei Iancu
*Director of the United States Patent and Trademark Office*